United States Patent
Lewis et al.

(10) Patent No.: US 9,510,036 B1
(45) Date of Patent: Nov. 29, 2016

(54) SYSTEMS AND METHODS FOR PROVIDING CONTENT IN A CONTENT LIST

(71) Applicant: Google Inc., Mountain View, CA (US)

(72) Inventors: Justin Lewis, Marina del Rey, CA (US); Ruxandra Georgiana Davies, Santa Monica, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/937,480

(22) Filed: Nov. 10, 2015

Related U.S. Application Data

(60) Provisional application No. 62/246,436, filed on Oct. 26, 2015.

(51) Int. Cl.
| | | |
|---|---|---|
| *H04N 21/23* | (2011.01) | |
| *H04N 21/262* | (2011.01) | |
| *G06F 17/30* | (2006.01) | |
| *H04N 21/239* | (2011.01) | |
| *H04N 21/2668* | (2011.01) | |
| *H04N 21/442* | (2011.01) | |
| *H04N 21/81* | (2011.01) | |

(52) U.S. Cl.
CPC .... *H04N 21/26258* (2013.01); *G06F 17/3084* (2013.01); *G06F 17/30849* (2013.01); *H04N 21/2393* (2013.01); *H04N 21/2668* (2013.01); *H04N 21/44222* (2013.01); *H04N 21/812* (2013.01)

(58) Field of Classification Search
None
See application file for complete search history.

(56) References Cited

U.S. PATENT DOCUMENTS

| | | | |
|---|---|---|---|
| 8,997,150 B2* | 3/2015 | Kilar | 725/40 |
| 2007/0157228 A1* | 7/2007 | Bayer | G06Q 30/02 725/34 |
| 2008/0092159 A1* | 4/2008 | Dmitriev | G06Q 30/0269 725/34 |
| 2014/0222550 A1 | 8/2014 | Bayer et al. | |
| 2015/0120470 A1 | 4/2015 | Roever et al. | |
| 2015/0154661 A1 | 6/2015 | Chakrabarti et al. | |
| 2015/0156547 A1 | 6/2015 | Chakrabarti et al. | |
| 2015/0220264 A1 | 8/2015 | Lewis et al. | |

* cited by examiner

*Primary Examiner* — Cai Chen
(74) *Attorney, Agent, or Firm* — Foley & Lardner LLP; John D. Lanza

(57) ABSTRACT

Providing content in a content list may include identifying positions within the list where content can be provided. A client agent may automatically play items of content at a first position when determining that the first position is within a displayed region of the content list. The client agent may identify a duration during which the first item is within the displayed region of the list, pause playback of the first item at a point in time when the displayed region of the list is advanced to no longer include the first position, and compare the first duration to a threshold value. The client agent may determine that the displayed region of the list has advanced to a second position and resume playback of the first item near the point in time and at the second position if the duration is less than the threshold value.

20 Claims, 5 Drawing Sheets

SYSTEMS AND METHODS FOR PROVIDING CONTENT IN A CONTENT LIST

CROSS-REFERENCES TO RELATED APPLICATIONS

This application claims the benefit of priority under 35 U.S.C. §119 to U.S. Provisional Patent Application No. 62/246,436, filed on Oct. 26, 2015, which is hereby incorporated by reference herein in its entirety.

BACKGROUND

Items of content on the Internet, such as videos (including user-created videos), pictures, audio recordings, text, interactive games, quizzes, or other such content, may be displayed or presented in a list, sometimes referred to as a "feed", "stream", "timeline", or by other such names. In some instances, such as with audio or video, the content may be configured to automatically play when displayed by an application as a user scrolls through the list, providing an easy way to ingest content.

SUMMARY

Internet content may be monetized through additional paid content, such as advertising, which may both support server and network infrastructure for the feeds as well as incentivize content creation through payments per viewing and/or interaction. In some instances, in which items of content are individually or serially displayed, advertising may be displayed in banners, adjacent to the content, or in pop-up windows. In some instances with multimedia content, such as videos, advertising may be shown via pre-roll or post-roll videos before or after the content, or as interstitial advertising inserted into a break in the middle of the content or between items of content.

Playback of videos in content feeds ("in-feed videos") has created a new opportunity for in-feed video advertisements. In-feed video advertisements may capture more user attention than other feed advertisement formats because users tend to not appreciate in-stream ads that play back at the beginning of or in the middle of a video because the user did not explicitly choose to watch any of the videos they scroll to. Ads on mobile scrollable streams have traditionally not been "unskippable." Users have always been able to scroll past ads. In-feed ads generally have a lower view through rate (VTR) than in-stream ads.

Accordingly, in one implementation of the systems and methods discussed herein, providing content in a content list may include identifying positions within the list where content can be provided. A client agent may automatically play items of content at a first position when determining that the first position is within a displayed region of the content list. The client agent may identify a duration during which the first item is within the displayed region of the list, pause playback of the first item at a point in time when the displayed region of the list is advanced to no longer include the first position, and compare the first duration to a threshold value. The client agent may determine that the displayed region of the list has advanced to a second position and resume playback of the first item near the point in time and at the second position if the duration is less than the threshold value.

One implementation disclosed herein is a method for providing video content in a content list. The method includes receiving, at a server from a device, a request for a content list, identifying, by the server, a plurality of positions within the content list where video content can be provided, and providing, by the server to the device, the content list for presentation to a user and a client agent for execution by the device. The client agent is configured to play items of content and determine that a first position of the plurality of positions is within a displayed region of the content list. The method also includes receiving, by the server, a request from the device for a first item of content transmitted in response to the determination that the first position of the plurality of positions is within the displayed region of the content list and providing, by the server, the first item of content to the device for automatic playback at the first position within the content list. The client agent identifies a first duration during which the first item of content is within the displayed region of the content list, pauses playback of the first item of content at a point in time in response to the displayed region of the content list being advanced to no longer include the first position, and compares the first duration to a predetermined threshold value. The client agent also determines that the displayed region of the content list has advanced to a second position of the plurality of positions and, responsive to a determination that the first duration is less than the predetermined threshold value, resumes playback of the first item of content near the point in time and at the second position of the content list.

In some implementations, the method includes comparing, by the server, the first duration to a monetization threshold different from the predetermined threshold.

In some implementations, the method includes providing, by the server to the device, a second item of content related to the first item of content for playback at a third position in the content list, responsive to a determination by the client agent that the first duration is less than the predetermined threshold.

In some implementations, the method further includes receiving, by the server from the device, an identification of cumulative playback time comprising a sum of the first duration and a second duration of playback of the second item of content and comparing, by the server, the cumulative playback time to a monetization threshold.

In another aspect, the present disclosure is directed to a system for displaying video content in a content list. The system includes a device having a display and a processor executing a client agent. The display is configured to display a content list and the device is configured to receive the content list from a server. The content list includes a plurality of positions where items of content can be provided. The client agent is configured to render the content list for display, determine that the content list has advanced such that a first position of the plurality of positions is within a displayed region of the content list, and receive a first item of content transmitted from the server in response to the determination that the first position of the plurality of positions is within a displayed region of the content list. The client agent is also configured to render the first item of content for automatic playback at the first position within the content list, identify a first duration that the first item of content is within the displayed region of the content list, and pause playback of the first item of content at a point in time in response to the displayed region of the content list being advanced to no longer include the first position. The client agent is also configured to determine that the content list has advanced such that a second position of the plurality of positions is within the display region of the content list, compare the first duration to a predetermined threshold value, and render, at the second position in response to the first duration being less than the predetermined threshold value, the first item of content for automatic playback beginning near the point in time.

In some implementations, the device is configured to transmit the first duration to the server. The server compares the first duration to a monetization threshold that is different from the predetermined threshold.

In some implementations, the device is configured to receive, from the server responsive to a determination that the first duration is less than the predetermined threshold, a second item of content related to the first item of content for playback at a third position in the content list.

In some implementations, the device is further configured to identify a cumulative playback time comprising a sum of the first duration and a second duration of playback of the second item of content and transmit the cumulative playback time to the server. The server compares the cumulative playback time to a monetization threshold.

In some implementations, the device is configured to compare the first duration to a second predetermined threshold, the second position nearer to the first position responsive to the first duration being greater than a second predetermined threshold and farther from the first position responsive to the first duration being less than the second predetermined threshold.

In still another aspect, the present disclosure is directed to a method for displaying video content on a device in a content list. The method includes receiving, by a device from a server, a content list comprising a plurality of positions where items of content can be provided, rendering the content list for display, and determining, by a client agent executed by the device, that the content list has advanced such that a first position of the plurality of positions is within a displayed region of the content list. The method also includes receiving a first item of content transmitted from the server in response to the determination that the first position of the plurality of positions is within a displayed region of the content list, rendering the first item of content for automatic playback at the first position within the content list, and identifying a first duration that the first item of content is within the displayed region of the content list. The method also includes pausing playback of the first item of content at a point in time in response to the displayed region of the content list being advanced to no longer include the first position, determining that the content list has advanced such that a second position of the plurality of positions is within the display region of the content list, comparing the first duration to a predetermined threshold value, and rendering, at the second position in response to the first duration being less than the predetermined threshold value, the first item of content for automatic playback beginning near the point in time.

In some implementations, the method also includes transmitting the first duration to the server. The server comparing the first duration to a monetization threshold that is different from the predetermined threshold.

In some implementations, the method includes receiving, by the client agent from the server, a second item of content related to the first item of content for playback at a third position in the content list responsive to a determination that the first duration is less than the predetermined threshold.

In some implementations, the method further includes identifying, by the client agent, a cumulative playback time comprising a sum of the first duration and a second duration of playback of the second item of content. The method also includes transmitting, from the device to the server, the cumulative playback time. The server compares the cumulative playback time to a monetization threshold.

These implementations are mentioned not to limit or define the scope of the disclosure, but to provide an example of an implementation of the disclosure to aid in understanding thereof. Particular implementations may be developed to realize one or more of the following advantages.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

DETAILED DESCRIPTION

A user's interaction with a stream, list, feed, or timeline of content, referred to generally as a list of content, may be monitored and additional items content, such as advertising or other paid content, may be inserted into the list at a position based on the user's interaction. Content may include videos (including user-created videos), pictures, audio recordings, text, interactive games, quizzes, or other such content, and may be of any length. In some implementations, an application displaying the list of content, such as a web browser or application, may be configured to automatically play audio or video recordings as they are displayed within a window, e.g. as a user scrolls through the list of content and/or pauses on an audio or video recording.

The additional items of content may be associated with predetermined positions or locations identified in a content list for insertion of the items of content. In one implementation, a video (e.g., an advertisement) or series of videos can be played in the content list multiple times so that a user who advances the display region (e.g., by scrolling) past the video watches a new part of the video (or the next video in a series of videos) in a different slot of the feed. The watch time of the user for each video in the feed that is part of the same advertising campaign is counted cumulatively toward a specific threshold. A client engine, based on the amount of the video that was viewed, determines if the user scrolled past a video because they were not interested in the content or because they were trying to skip the advertisement. If the user scrolls the video off screen before a minimum watch time threshold is reached, then the video advertisement can be placed in the next available advertisement content list position or slot.

Figure 1A:
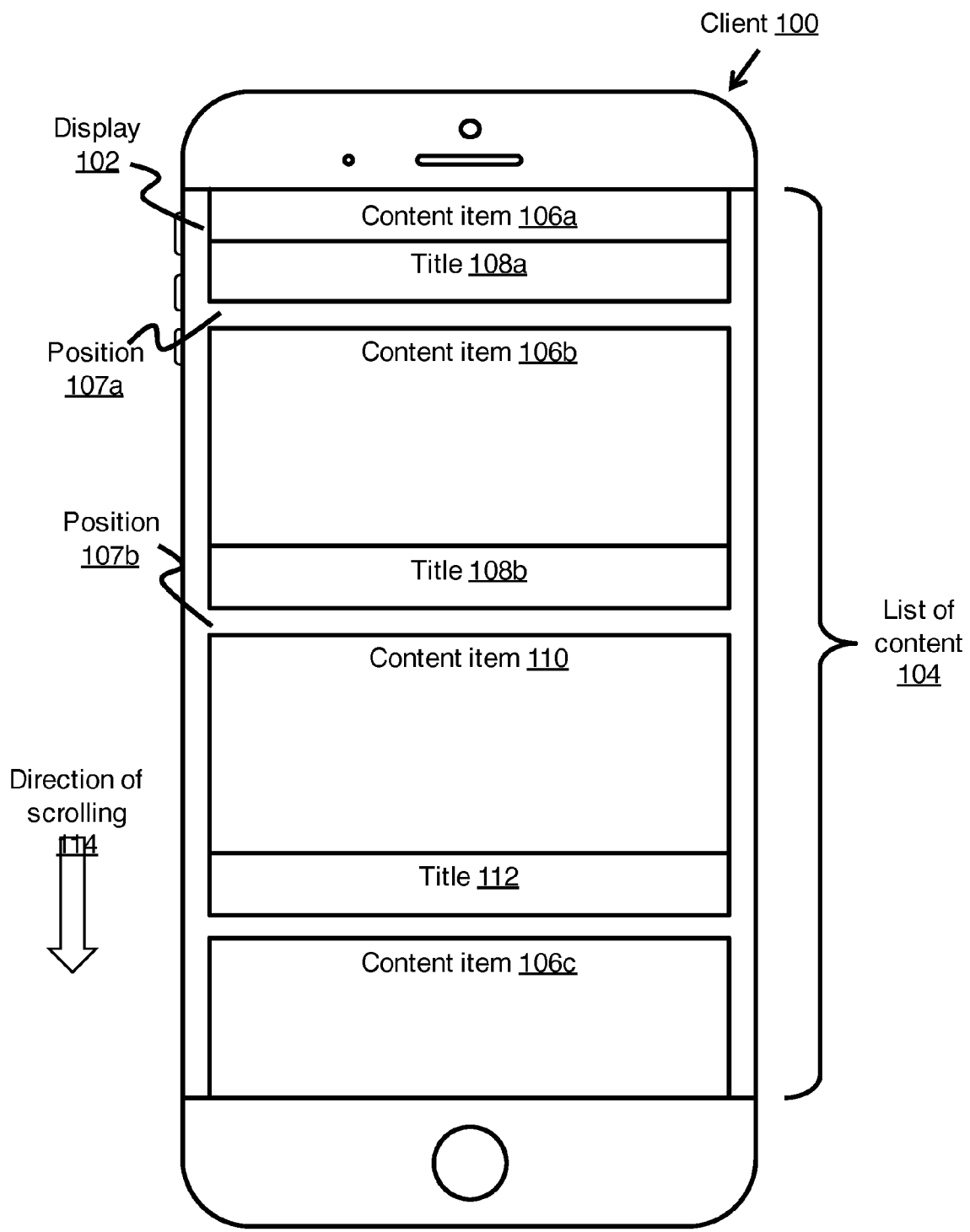
FIG. 1A is an illustration of display of and interaction with a content list, according to one implementation.

Illustrated in FIG. 1A is one implementation of display of and interaction with a list of content shown on a client 100.

Client 100 may comprise a mobile or portable computing device, such as a smart phone, tablet, or wearable computing device. In other implementations, client 100 may comprise a desktop or laptop computer, a workstation computer, or any other type and form of computing device. Client 100 may comprise a display 102, which may, in many implementations, comprise a touch sensitive or multi-touch sensitive display. In other implementations, client 100 may include separate input devices (not illustrated), such as a mouse, keyboard, touch pad, voice command interface, scroll wheel, or any other such input device.

A display 102 may display a list of content 104. The list of content 104 may be displayed by an application, such as a web browser or a stand-alone application, such as a media viewer application, social networking application, or other such application. In many implementations, the list of content 104 may be larger than or extend beyond the display 102, and may be advanced or scrolled by a user to view other items of content within the list. Although shown as a vertical one-dimensional list, in some implementations, the list of content 104 may be two-dimensional and referred to as an array of content and allow advancement or scrolling in multiple directions. Such an array of content may comprise groups of content arranged in different columns by genre, creator, length, type, date created, or any other such identifier. In still other implementations, the list of content 104 may be three-dimensional, with additional classifications of content provided via depth.

The list of content 104 may include one or more items of content 106a-106c, referred to generally as items of content 106 or first items of content 106. Items of content 106 may comprise any type and form of content, including video and/or audio recordings, pictures, text, animations, interactive games, quizzes, charts, or diagrams. Items of content 106 may be of any length, such as 10 second animations or two hour movies. In many implementations, items of content 106 may be associated with a corresponding title or caption 108a-108c, referred to generally as a title 108. In many implementations, the list of content 104 may display a thumbnail or image representative of an item of content 106, and responsive to the user scrolling the list 104 to fully display the representative thumbnail or image within display 102, the corresponding content item may be loaded and played. The list of content may include still images from videos and as a user scrolls an image completely into display 102, the application may begin playing the video automatically. In some implementations, playback may pause if the user continues scrolling and the content touches the edge of the display 102; or may continue until the content has partially or completely scrolled off of the display 102. The user may be allowed to scroll items of content off the display, pausing or skipping playback of the item of content. In a further such implementation, the item of content may be removed from the list responsive to such scrolling off the display.

As discussed above, paid items of content or other such items of content 110 may be inserted into the list of content 104, and appear inserted between items of content 106. In the illustration of FIG. 1A, an item of content 110 has been inserted at a position 107 between a content item 106b and a content item 106c. Items of content 110 may be referred to as second items of content, paid content, interstitial content, inserted content, or by any other such term. In many implementations, an item of content 110 may have an associated title or caption 112, as shown. As with items of content 106, items of content 110 may comprise any type and form of content, including video and/or audio recordings, pictures, text, animations, interactive games, quizzes or surveys, charts, diagrams, engagement advertisements, social advertisements, search advertisements, carousel advertisements, or application installation advertisements. Similarly, as discussed above, items of content 110 may be displayed as thumbnails or static images and/or may be automatically played subsequent to playback of an associated item of content 106. In some implementations, a user may select an item of content 110 to load an associated web page in a web browser or other application, or may flag the item of content 110 for subsequent review and loading of associated web pages.

As shown, a user may scroll the list of content 104 to view different content items 106 in a direction of scrolling 114. Although shown pointing downwards, as discussed above, in many implementations, the user may scroll either upwards or downwards, or in some implementations, left or right and/or forwards and backwards in a z-plane. Accordingly, the direction of scrolling 114 may refer to a present or most recent direction of scrolling. In the illustration of FIG. 1A, the user has scrolled the list of content 104 downwards, such that content item 106a is almost completely moved off the top of the display 102 and content item 106c has appeared at the bottom of the display 102. Responsive to the direction of scrolling 114, a content item 110 (and associated title 112) has been inserted into the list of content 104 at a position 107 subsequent to content item 106b (and associated title 108b) as shown. As discussed above, content item 110 may be inserted into a position 107 in the list responsive to the user scrolling through the list 104 and pausing to view content item 106b, and accordingly, is inserted at a position subsequent to content item 106b in the direction of scrolling 114. Conversely, if the user had been scrolling upwards and paused on content item 106b, in such implementations, content item 110 would be inserted into the list at a position 107 between content item 106a and content item 106b. In some implementations, the direction of scrolling may be considered a parameter-value pair (e.g. "scrolling-upwards" or via similar identifiers) and may be transmitted in requests and/or responses or stored in memory as such. In other implementations, the direction of scrolling may be identified via a bit or flag set to a predetermined value for a location. In still other implementations, the direction of scrolling may be identified via a vector, with a length identifying a speed or rate of scrolling.

Although a single item of content 110 is illustrated in FIG. 1A, in some implementations, multiple positions or locations 107 or each position 107 between each item of content (e.g., items of content 106a, 106b, and 106c) may have an item of content 110 inserted. Each content item 110 may display the same content as the previous content item 110, related content to the previous content item 110, or unrelated content to the previous content item 110. Similar to content items 106a, 106b, and 106c, content items 110 may be paused when it is advanced or scrolled out of the displayed region. In some implementations, playback of content items 110 may automatically resume when they are brought back into the display region or into focus.

In some implementations, client 100 may identify the duration that each content item 110 was played or viewed. Client 100 may compare the duration to a threshold value associated with a minimum ad impression time. If the duration is greater than the threshold value, then the content of the content item 110 provided at the next location 107 may be unrelated to the previous content item 110. If the duration is less than the threshold value, then the content item 110 inserted at the next location 107 may be the same as the previous content item 110 and resume playback of the content.

In some implementations, if the duration is less than the threshold value, then the content item 110 inserted at the next location 107 may be different than but related to the previous content item 110 (e.g., a video in a series of videos or in the same advertisement campaign). The duration of playback or viewing for each content item 110 that is related is summed together as a cumulative playback or viewing time. The content item 110 at the next location 107 may be a related content item 110 until the cumulative playback time exceeds a predetermined threshold of time.

Figure 1B:
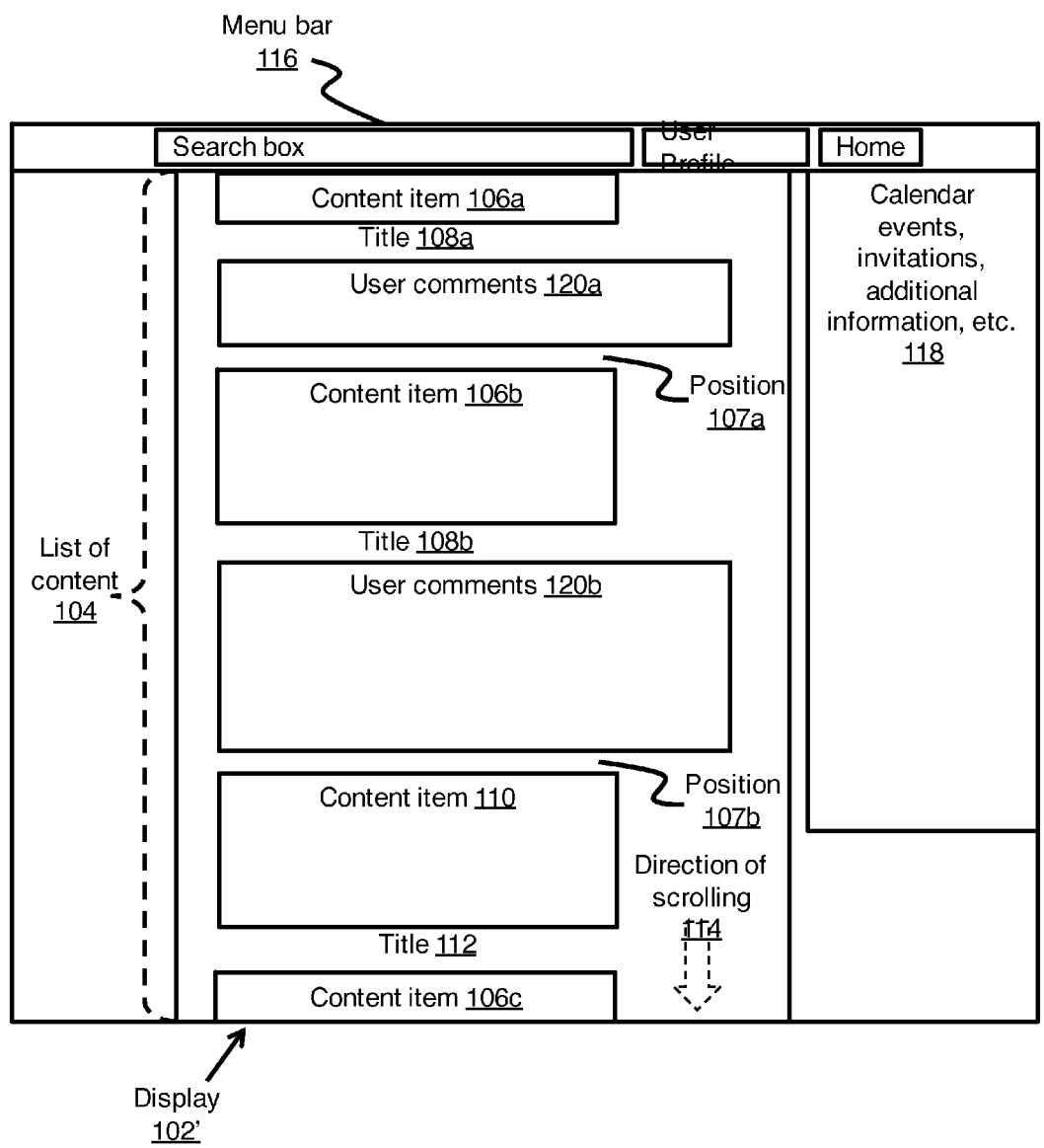
FIG. 1B is another illustration of display of and interaction with a content list, according to one implementation.

Referring briefly to FIG. 1B, illustrated is another implementation of a display 102' showing a list of content 104. Display 102' may comprise an application window, such as a window of a web browser, social networking application, or other such application, a full screen window, or any other such display. Display 102' may be presented by a computing device, such as a desktop computer, laptop computer, tablet computer, smart phone, wearable computer, or any other type and form of computing device. In some implementations, as shown, a display 102' may include a menu bar 116, which may comprise fields or user interface items for searching for content or other users, viewing user profiles, etc. Display 102' may also include a sub-frame 118 or display of calendar events, invitations, additional information or content, as well as other such features. Although shown scrolling vertically as in FIG. 1A, the list of content 104 may scroll horizontally, or may be a two or three dimensional array and scroll vertically, horizontally, and/or forwards and backwards in a z-plane. In some implementations, as shown in FIG. 1B, each content item 106a may be further associated with one or more user comments 120a-120b, referred to generally as comments 120. Comments 120 may be submitted by the user or other users viewing the corresponding item of content, and may be displayed in full, truncated, linked, or otherwise shown. As shown in FIG. 1B and similar to FIG. 1A, a content item 110 may be inserted into the list of content 104 in a position subsequent to a content item 106 (and associated title 108 and/or comments 120) in a direction of scrolling 114, responsive to interaction with the content item 106.

A direction of scrolling 114 may refer to a direction in which a visible portion of the list of content 104 shown within display 102, 102' moves across the list, rather than a direction of user interaction with the list, which may be variable dependent on operating system or application configuration. In one implementation, a user may move a scroll bar downwards, while in another implementation, the user may swipe a finger upwards on the list, with both interactions resulting in the display showing a portion of the list further down the list, or scrolling the list downwards.

As discussed above, a content item 106 in the list of content 104 may be associated with the inserted item of content 110 at a position 107. This association may be used for revenue sharing, audience measurement, or other such purposes, as well as personalized selection of content 110 based on one or more characteristics of content item 106 (e.g. genre, keywords, subject, etc.). Similarly, as discussed above, content item 110 may be inserted in a position 107 subsequent to the associated content item 106, such that the inserted item is "next" or appears after the related content item 106. In many implementations, content item 110 may be inserted to appear at a position 107 immediately subsequent to the associated content item 106, while in other implementations, content item 110 may be inserted at a position 107 farther along in the list, responsive to an average speed of scrolling of the list or an average rate of user interaction with the list. As used herein, both positions 107 immediately subsequent to the associated content item and farther along in the list in the same direction may be referred to as subsequent or adjacent positions 107 in the list. Horizontal scrolling, as well as two or three-dimensional scrolling may also be considered, with the content item 110 inserted at a position 107 along a vector of the most recent scrolling direction.

Figure 2A:
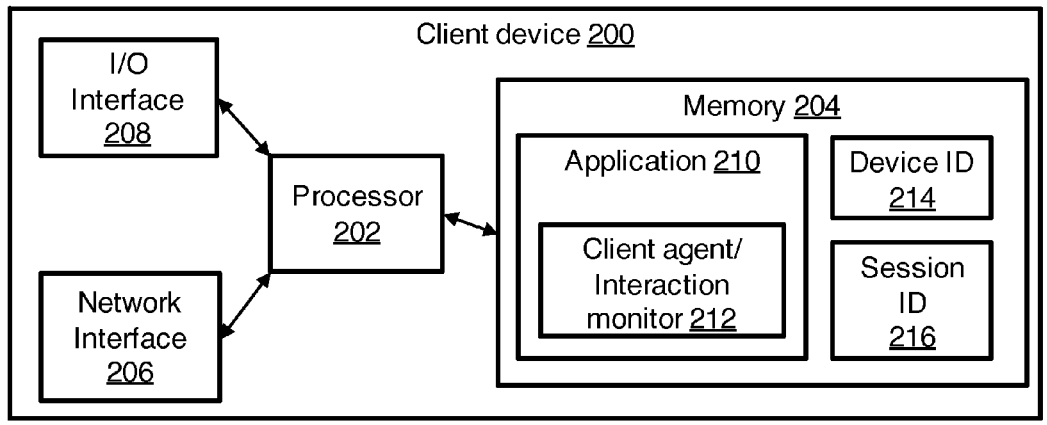
FIG. 2A is a block diagram of a client device, according to one implementation.

Illustrated in FIG. 2A is a block diagram of one implementation of a computing device 200 of a client, such as client 100 or a device providing a display 102, 102'. Client device 200 may be any number of different types of user electronic devices configured to communicate via a network, including without limitation, a laptop computer, a desktop computer, a tablet computer, a smartphone, a digital video recorder, a set-top box for a television, a video game console, or any other type and form of computing device or combinations of devices. In some implementations, the type of client device 200 may be categorized as a mobile device, a desktop device or a device intended to remain stationary or configured to primarily access a network via a local area network, or another category of electronic devices such as a media consumption device.

In many implementations, client device 200 includes a processor 202 and a memory 204. Memory 204 may store machine instructions that, when executed by processor 202 cause processor 202 to perform one or more of the operations described herein. Processor 202 may include a microprocessor, ASIC, FPGA, etc., or combinations thereof. In many implementations, processor 202 may be a multi-core processor or an array of processors. Memory 202 may include, but is not limited to, electronic, optical, magnetic, or any other storage devices capable of providing processor 202 with program instructions. Memory 202 may include a floppy disk, CD-ROM, DVD, magnetic disk, memory chip, ROM, RAM, EEPROM, EPROM, flash memory, optical media, or any other suitable memory from which processor 202 can read instructions. The instructions may include code from any suitable computer programming language such as, but not limited to, C, C++, C#, Java, JavaScript, Perl, HTML, XML, Python and Visual Basic.

Client device 200 may include one or more network interfaces 206. A network interface 206 may include any type and form of interface, including Ethernet including 10 Base T, 100 Base T, or 1000 Base T ("Gigabit"); any of the varieties of 802.11 wireless, such as 802.11a, 802.11b, 802.11g, 802.11n, or 802.11ac; cellular, including CDMA, LTE, 3G, or 4G cellular; Bluetooth or other short range wireless connections; or any combination of these or other interfaces for communicating with a network or other computing devices. In many implementations, client device 200 may include a plurality of network interfaces 206 of different types, allowing for connections to a variety of networks, such as local area networks or wide area networks including the Internet, via different sub-networks.

Client device 200 may include one or more user interface or input/output devices 208. A user interface device 208 may be any electronic device that conveys data to a user by generating sensory information (e.g., a visualization on a display 102, 102', one or more sounds, tactile feedback, etc.) and/or converts received sensory information from a user into electronic signals (e.g., a keyboard, a mouse, a pointing device, a touch screen display, a microphone, etc.). The one or more user interface devices may be internal to the housing of client device 200, such as a built-in display, touch screen, microphone, etc., or external to the housing of client device 200, such as a monitor connected to client device 200, a speaker connected to client device 200, etc., according to various implementations.

Client device 200 may include in memory 204 an application 210 or may execute an application 210 with a processor 202. Application 210 may be an application, applet, script, service, daemon, routine, or other executable logic for receiving content and for transmitting responses, commands, or other data. In one implementation, application 210 may be a web browser, while in another implementation, application 210 may be media presentation application. Application 210 may include functionality for displaying content received via network interface 206 and/or generated locally by processor 202, and for transmitting interactions received via a user interface device 208, such as requests for websites, selections of survey response options, input text strings, etc.

In some implementations, application 210 may include a client agent 212. Client agent 212 may include an application plug-in, application extension, subroutine, browser toolbar, daemon, or other executable logic for collecting data processed by application 210 and/or monitoring interactions of a user with an interface 208. In other implementations, client agent 212 may be a separate application, service, daemon, routine, or other executable logic separate from application 210 but configured for intercepting and/or collecting data processed by application 210, such as a screen scraper, packet interceptor, API hooking process, or other such application. Client agent 212 may be configured for intercepting or receiving data input via user interface device 208, including mouse clicks, scroll wheel movements, gestures such as swipes, pinches, or touches, or any other such interactions; as well as data received and processed by application 210 including content displayed or media played, duration of playback, as well as interactions with playback controls including pausing, resetting or restarting, fast forwarding, muting, or any other such interactions. Client agent 212 may identify streamed multimedia content received by a client device, such as a television show, movie, song, music video, or other such content. Content may be identified based on identifier tags including ID3 tags or other such metadata, uniform resource locators (URLs) or uniform resource identifiers (URIs), filenames, captions, titles, or any other type and form of data accompanying the content. Client agent 212 may identify or track playback or view time durations or cumulative playback times of content items 110. Client agent 212 may compare the durations or playback times to predetermined thresholds and determine what content item 110 to insert at a next position 107 based on the comparison.

Client 200 may include or be identified with a device identifier 214. Device identifier 214 may include any type and form of identification, including without limitation a MAC address, text and/or numerical data string, a username, a cryptographic public key, cookies, device serial numbers, user profile data, network addresses, or any other such identifier that may be used to distinguish the client 200 from other clients 200. In some implementations, a device identifier 214 may be associated with one or more other device identifiers 214 (e.g., a device identifier for a mobile device, a device identifier for a home computer, etc.). In many implementations, to preserve privacy, the device identifier 214 may be cryptographically generated, encrypted, or otherwise obfuscated. In some implementations, client 200 may include a session identifier 216, which may be similar to a device identifier 214 but generated more frequently, such as hourly, daily, upon activation of application 210, or any other such period. Session identifiers 216 may be generated by a client device 200 or received from a server, content provider, or other device. Session identifiers 216 may be used in place of device identifiers 214 to increase anonymity, or may be used in connection with device identifiers 214 to distinguish interactions of one session from those of another session.

Figure 2B:
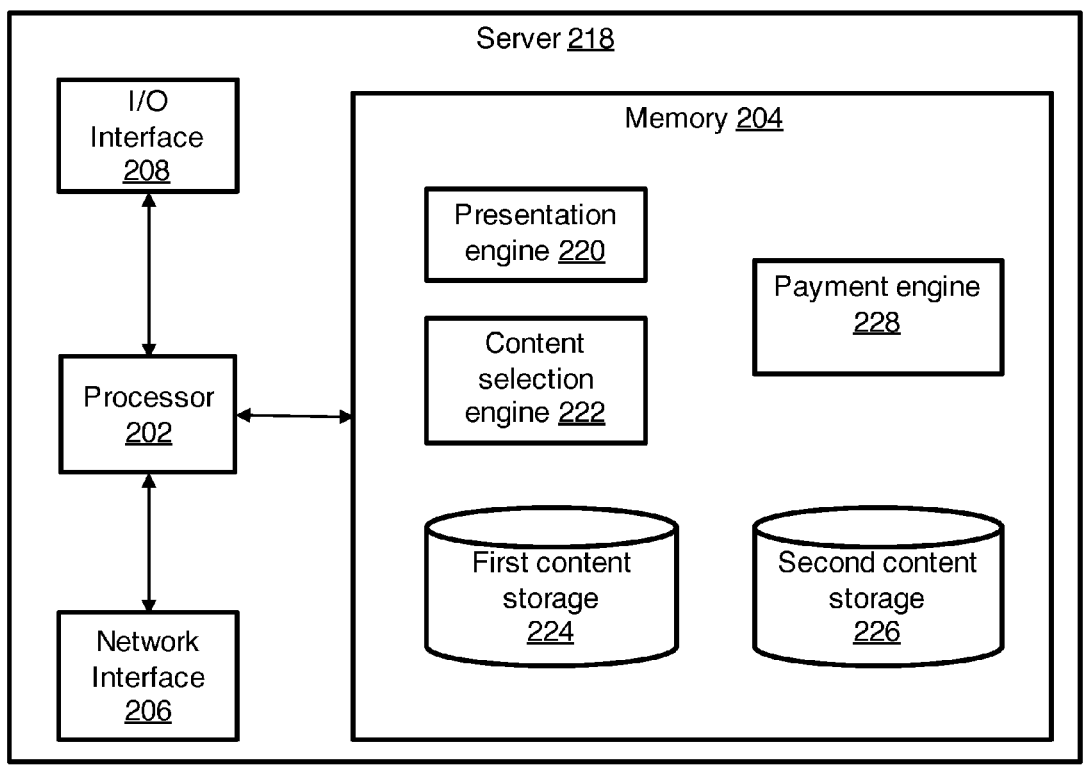
FIG. 2B is a block diagram of a server device, according to one implementation.

Referring now to FIG. 2B, illustrated is a block diagram of an implementation of a computing device or server 218, such as a content provider. As with client devices 200, server 218 may include one or more processors 202, memories 204, network interfaces 206, and user interfaces 208. In some implementations referred to as headless servers, a server 218 may not include a user interface 208, but may communicate with clients 200 with user interfaces 208 via a network. Memory 204 may include first content storage 224 for storing content for inclusion in a list 104, such as storage of webpages, images, audio files, video files, data files, or any other type and form of data. Memory 204 may also include second content storage 224 for storing content to be inserted, responsive to detected interactions, into a list 104 populated with content from first content storage 224. In some implementations, memory 204 may store one or more applications 210 (not illustrated) for execution by processor 202 of the server 218, including FTP servers, web servers, mail servers, file sharing servers, peer to peer servers, or other such applications for delivering content stored in content storage 224, 226.

In some implementations, a server 218 may execute a presentation engine 220. Presentation engine 220 may comprise an application, service, server, daemon, routine, or other executable logic for presenting or providing a list of items of content to a client device, including content identifiers. In some implementations, presentation engine 220 may select one or more items of content from first content storage 224 responsive to a request for a list of content received from a client device. Such requests may include identifiers of content to be included in the list, including keywords, creator names, genres, types, etc. Presentation engine 220 may retrieve identifications of corresponding first items of content and assemble the list for transmission to client device 200. In some implementations, the list may be assembled as an XML file or HTML file, while in other implementations, the list may be assembled in any other encoding type or format for interpretation by an application on client device 200. Presentation engine 220 may, in some implementations, receive identifications of one or more second items of content to be included in a list and identifications of corresponding one or more first items of content currently in the list and associated with the selected one or more second items of content, and regenerate or modify the list to include the identified one or more second items of content at positions subsequent to the corresponding one or more first items of content in a direction of scrolling of the list. In other implementations, identifications of the second item of content and corresponding first item of content may be transmitted to client device 200. Application 210 and/or client agent 212 may modify a previously-received list 104 to include the received identification of the second item of content at a position subsequent to the corresponding first item of content in the direction of scrolling. This may reduce processing requirements on server 218 and the need to retransmit the entire list for display, as well as reducing data required to be sent to server 218. In one such implementation, responsive to detecting an interaction with a first item of content, application 210 may request a second item of content for inclusion in the list from server 218, the request including an identification of the first item of content. The server 218 may select a second item of content based on characteristics of the first item of content, and transmit a response identifying the second item of content to the client 200. The application 210 may then modify the list to include the identification of the second item of content in a position subsequent in a direction of scrolling to the first item of content. Accordingly, such modification functions may be performed by application 210 rather than presentation engine 220 in such implementations.

In some implementations, server 218 may execute a content selection engine 222. A content selection engine 222 may comprise an application, service, routine, server, daemon, or other executable logic for selecting content from first content storage 224 and/or second content storage 226 responsive to a request comprising one or more identifiers. A request for a list of content may include a device identifier, user identifier, session identifier, keyword, genre, type, creator, creation date, unwatched flag, or any other type and form of identification or characteristic. Content selection engine 222 may identify one or more items of content in first content storage 224 matching the characteristics or identifiers in the request, and may provide the identifications to presentation engine 220 for inclusion in the generated list. In some implementations, content selection engine 222 may limit the number of identified items of content, returning 10, 20, 50 or any other predetermined number of items. Content selection engine 222 may similarly select an item of content from second content storage 226 responsive to a request from a client generated upon detection of an interaction with a first item of content displayed by an application of the client. Content selection engine 222 may select an item of content from content storage 226 based on one or more characteristics of the first item of content including genre, type, title, keywords, creator, creation date, or any other such information. In one implementation, a first item of content may be a brief video about a sporting event. Content selection engine 222 may select a second item of content related to the sport for inclusion in the list, with viewers of the first item of content likely to be interested in the second item of content.

In some implementations, a server 218 may execute a payment engine 228. Payment engine 228 may comprise an application, service, server, daemon, routine, or other executable logic for associating a creator, publisher, distributor, or sponsor of a first item of content with a paid second item of content inserted into a list responsive to a detected interaction with the first item of content. Payment engine 228 may provide revenue sharing from creators or publishers of paid content, such as advertising, to creators of popular first items of content that draw viewers, and/or indicate to a third-party payment system to provide payments and/or revenue sharing for such interactions. In some implementations, payment engine 228 may maintain a record or log of which items of content were interacted with, device identifiers of clients that interacted with the items, second items of content that were provided for inclusion in displayed lists, identifications of whether the second items of content were interacted with, etc. Payment engine 228 may compare durations of playback or viewing time to a monetization threshold to determine whether the item of content was viewed for a sufficient amount of time to charge the creator or publisher of paid content.

Figure 3A:
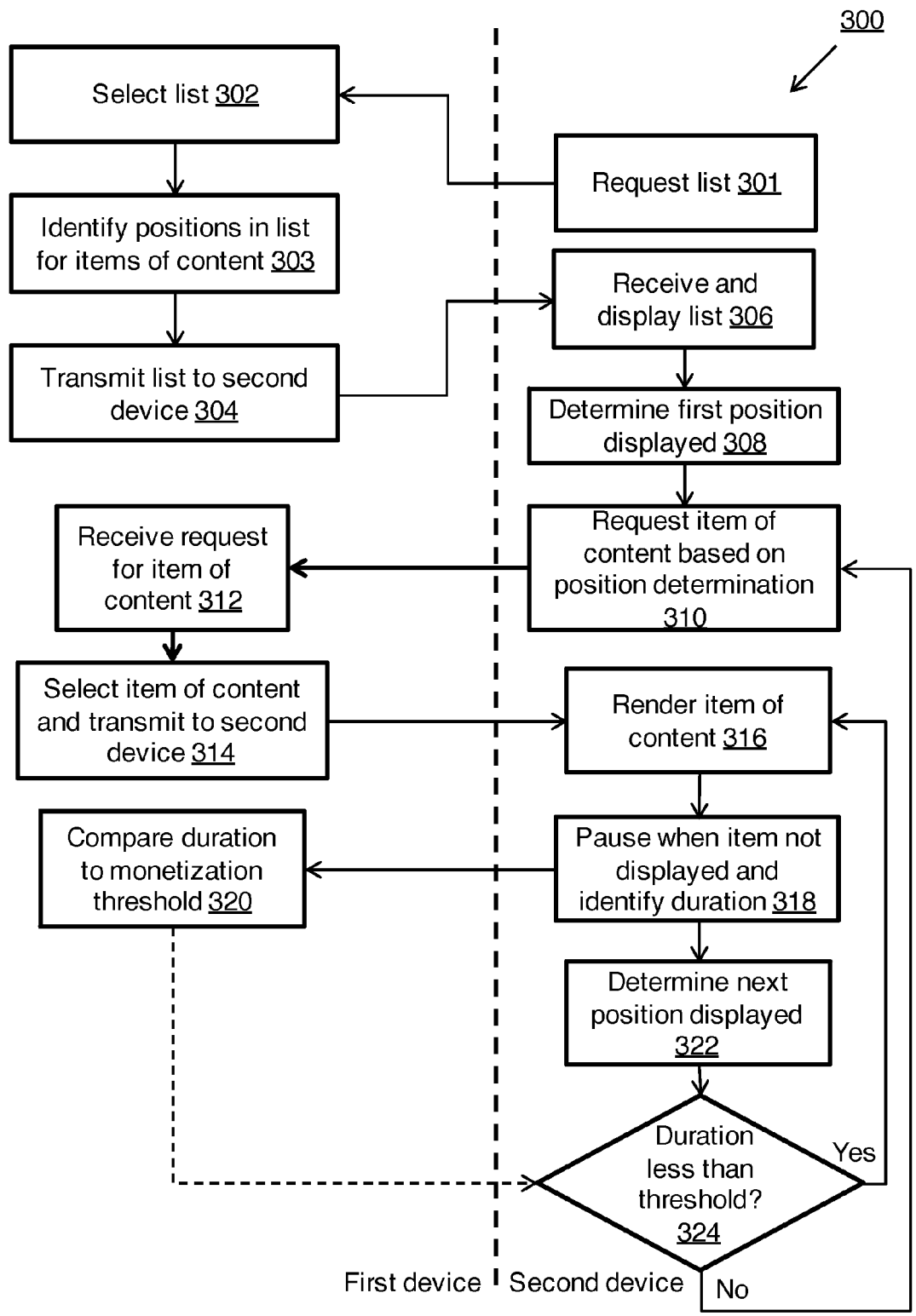
FIG. 3A is a flow diagram of the steps taken in one implementation of a process for providing content into a content list.

FIG. 3A is a flow chart of one implementation of a method 300 for selective insertion of additional content (e.g., content items 110) into a list of items of content (e.g., content list 104). As shown, a portion of method 300 may be performed by a first device, such as a content provider or server, while a second portion of method 300 may be performed by a second device, such as a client device. In other implementations, the method may be divided differently than illustrated, with a greater or fewer number of steps performed by each device, or with steps performed by other devices not illustrated.

At step 301, the second device (e.g., a client device) may request a content list from a first device (e.g., a server or content provider), for example through a web browser or other application executing on the second device. The request may be for content matching of a keyword, from a particular content creator or group of creators, for matching a genre, for content created within a recent time period, or any other such characteristics. At step 302, the first device may select one or more items of content for inclusion in a list. As discussed above, in some implementations, the first device may limit the number of results to a predetermined number, such as 10, 20, 50, or any other number of results, to reduce bandwidth, memory, and processor requirements. The first device generates the list of content and, at step 303, may identify the selected items and positions (e.g., positions 107) between content items (e.g., content items 106) where other content items (e.g., content items 110) can be inserted. At step 304, the list may be transmitted to the second device. The list may include an identification of each item of content, such as a uniform resource identifier (URI) of the item of content; a uniform resource locator (URL) or address from which the item of content may be retrieved; a URL or address from which a thumbnail or static image representative of the content may be retrieved; a title or caption of the item of content; one or more comments from other users that have viewed the item of content; a size of the item of content; a type of the item of content; and/or any other information about each item of content. The list may be an XML list, an HTML file including the list, a database, a flat file, or any other type and form of data.

At step 306, the second device may receive and display or render the list. The list may be received via any type and form of network, such as the Internet, and may be cached in memory and/or executed or interpreted by an application executed by the second device, such as a browser or media display application. In some implementations, a portion of the list may be displayed, such as identifications of a first few items of content of the list. Display of the list may comprise display of static images or thumbnails of pictures or videos, which may be retrieved separately or generated by the second device. The second device may receive the list and request thumbnails representative of content in the list, based on identified locations for the thumbnails in the list data. The thumbnails may be cached and displayed by the application, with content retrieved in the background and cached or retrieved dynamically in response to interaction by a user with the content.

At step 308, the device may determine whether a first identified position is being displayed by or is within the display region of the second device, such as by detecting an interaction with an item of content or the content list. Interactions may include scrolling or advancing the content list. As discussed above, the list may be scrolled via a scroll box, directional button, scroll wheel, touch gesture, voice command, or any other such interaction. If the first identified position is displayed, at step 310, the second device may request an item of content from the first device for insertion into the content list at the first position. The second device may not request the item of content if the item has previously been received (e.g., the user scrolled to a previous point in the list).

At step 312, the first device may receive the request for the second item of content. The request may include an identification of a nearby item of content, characteristics of the nearby item of content, and/or a scrolling direction of the list. At step 314, the first device may select the item of content for insertion based on the data in the request, based on user data or a user profile, or based on a prioritization of items of content for insertion and transmit the item of content to the second device. As discussed above, in some implementations, a content selection engine executed by the first device may retrieve one or more characteristics of the first item of content and search in a database for a second item of content having corresponding values for the one or more characteristics, such as a matching genre, keyword, creator, etc. In other implementations, the content selection engine may receive the characteristics from the second device and may search in the database for an item of content having corresponding values. The first device may transmit an identification of the item of content in response to the request, such identification including a title of the item of content; a URL of the second item of content; a URL or address from which the second item of content may be retrieved; a URL or address from which a thumbnail or static image representative of the second item of content may be retrieved; a title or caption of the second item of content; one or more comments from other users that have viewed the item of content; a size of the item of content; a type of the item of content; and/or any other information about the item of content.

As discussed above, at step 316, the second device may insert and display or render the item of content in a first position in the list identified by the first device. The insertion may be based on the received identification of scrolling of the list, and may modify the list to include the second item of content at a position subsequent to the first item of content in the direction of scrolling. In some implementations in which the second device displays the list via a web browser, the list may be updated on the server and transmit the updated list to the client for display rather than modifying the displayed page on the client. The second device may select a position in the list based on the received identification of scrolling of the list, and may modify the list to include the second item of content at a position subsequent to the first item of content in the direction of scrolling. As discussed above, such implementations do not require transmission of the direction of scrolling to the server, and may require less processing and bandwidth on the part of the server. As discussed above, in some implementations, the selected position in the list for insertion of the second item of content may be immediately subsequent to the first item of content, or may be displaced from the first item of content by one or more entries, such as based on a rate of scrolling of the list.

At step 318, the second device tracks the position of the content list that is in the display region. When the second device identifies that the first position where the inserted content item is being played is no longer within the displayed region, the device pauses playback of the content item at a point in time. The second device also identifies a duration that the content item played before being paused.

The duration information and an identification of the content item may be sent to the first device for further analysis. At a step 320, where the content item is an advertisement or other paid content, the first device compares the duration that the item was played to a monetization threshold (e.g., 15 seconds, 30 seconds, etc.). If the duration is less than the monetization threshold, the content creator or publisher may not be charged for the display of the advertisement. If the duration is greater than the monetization threshold, the content creator or publisher may be charged for display of the advertisement.

At step 322, the second device determines that the content list has advanced a second identified position within the display region of the content list where an item of content can be inserted. At step 324, the second device compares the duration that the previously inserted item of content played with a predetermined threshold value. In some implementations the threshold value may be two seconds, but in other implementations the threshold value may be one second, three seconds, ten seconds, or some other value.

If the duration or watch time is less than or equal to the threshold, the second device may determine that the user scrolled past the inserted content item without watching it. If the duration is less than the threshold, the same content item may be rendered or displayed (step 316) at the next position. If the same content item is shown again, the item may resume playback at the point at or near where it was initially paused in step 318. If the duration is greater than the threshold, the second device may determine that the user either started watching the content item and decided he was not interested in the content or watched the content item until completion indicating that he was interested in the content. If the duration is greater than the threshold, the second device the second device may return to step 310 and request a new item of content. The second device may also remove other occurrences of the content item from the content list.

In some implementations where the content item is an advertisement, the second device may play the same content item again even if the duration is greater than the threshold if the duration is not greater than a monetization threshold. In one implementation the monetization threshold may be 30 seconds, but in other implementations the monetization threshold may be 15 seconds, 20 seconds, or some other value. After the user watched the advertisement for a duration longer than the monetization threshold, the advertiser may be charged. If the user watched the advertisement for a duration longer than the threshold but less than the monetization threshold (e.g., enough to show an interest in the ad, but not enough to count towards monetization), the second device may show the advertisement again at a later position and resume where the advertisement was paused. The advertisement may be provided to an advertisement auction for the next impression slot in the feed. The effective cost per thousand impressions (eCPM) for this impression slot may be adjusted based on the probability that the user watches enough of the advertisement to pass the monetization threshold. The probability may be calculated based on a default probability for the advertisement plus an adjustment based on how much of the advertisement the user has already viewed and the number of impressions of the advertisement. The adjustment may be calculated from previous trials and the process can repeat as long as the eCPM for the video causes the ad campaign to win the auction. Typically, as the viewing time increases the eCPM increases, but as the number of impressions increases the eCPM decreases.

Figure 3B:
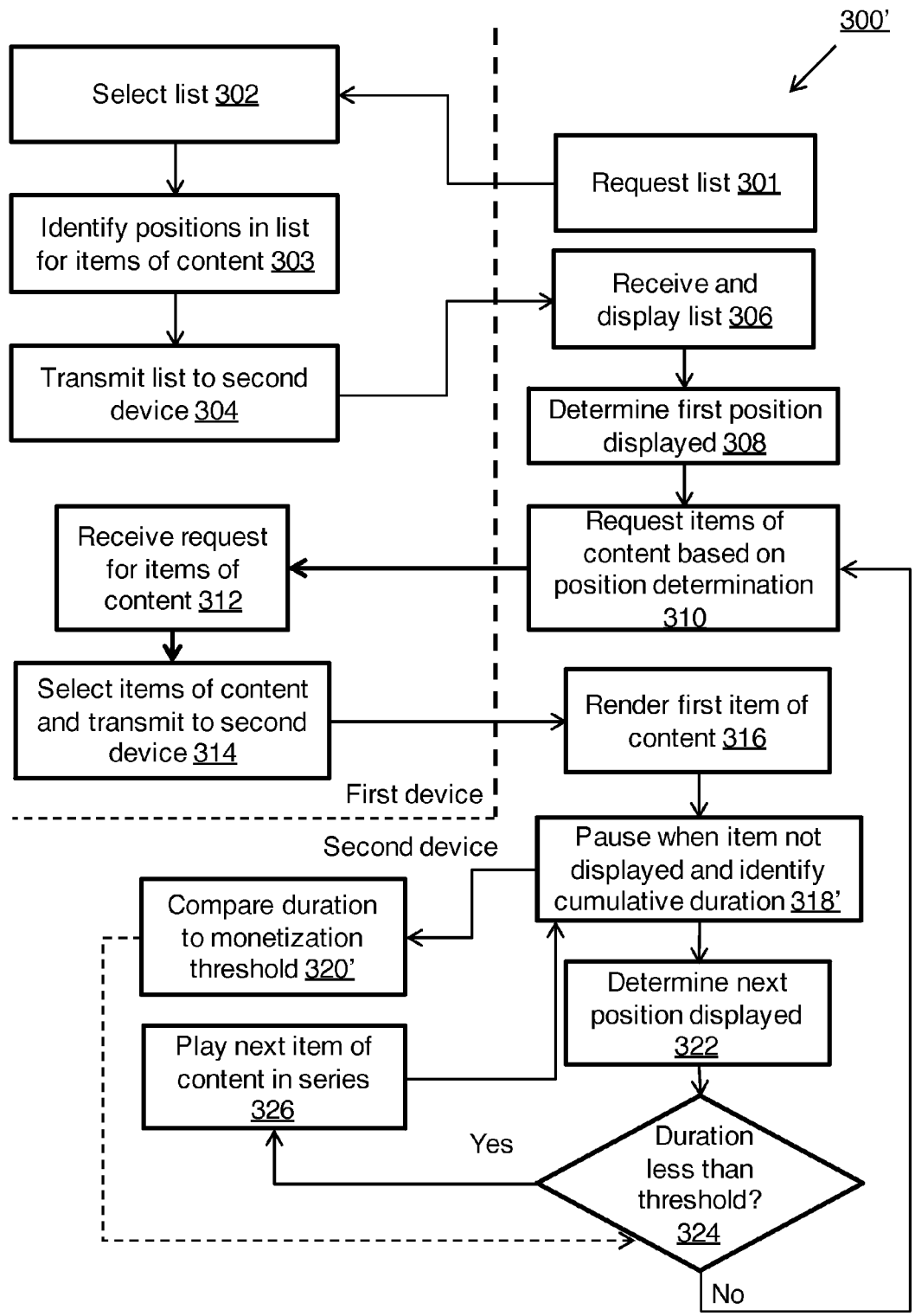
FIG. 3B is a flow diagram of the steps taken in one implementation of a process for providing content into a content list; and Like reference numbers and designations in the various drawings indicate like elements.

FIG. 3B is a flow chart of one implementation of a method 300' for selective insertion of additional content (e.g., content items 110) into a list of items of content (e.g., content list 104). Method 300' is similar to method 300, but rather than resuming a content item when the duration is less than the threshold, a new content item that is related to the previously inserted content item may be displayed. In some implementations, both the method 300 and the method 300' may be individually executed by the same devices or combined into a single method. That is, content items may be either resumed or a new related video may be played, if one exists, when the duration is less than the threshold.

In some implementations, the first device may decrease content list latency by providing multiple related content items for display in the feed list under different conditions (e.g., a user watched greater than or less than a threshold amount of the first content item). The second device may use the conditions to determine which ad impression to show. Therefore, the user may be able to scroll through or advance the content list with reduced lag.

After rendering the first inserted content item (step 316), at step 318', the second device tracks the position of the content list that is in the display region. When the second device identifies that the first position where the inserted content item is being played is no longer within the displayed region, the device pauses playback of the content item at a point in time. The second device also identifies a cumulative playback time or cumulative duration that the content item and any related content items played before being paused. The cumulative playback time may be a sum of the duration s of each related content item or a sum of the duration of a content item and a the previous cumulative playback time. In some implementations, the cumulative watch time may only be incremented if the duration for a content item is greater than an individual threshold (e.g., 2 seconds, 3 seconds, etc.).

Related content items may include a series of videos such as for an advertising campaign, but may also include any other series of content items that have some relation with each other based on subject matter, source, target, etc. In some implementations, the advertisements may be selected for content item slots based on a manipulated eCPM process. The process may adjust the eCPM based on one or more of the amount of cumulative playback time a user has watched from the ad campaign, the number of advertisements already displayed to the user, the number of advertisements in the campaign, and the likelihood that a user will see more advertising content items in the content list. In some implementations, the content list may only provide content items that are the highest rated items (e.g., most viewed, scored by users, etc.). When the content list displays all such content, it may display older content. Therefore, the content list feed may be finite and the number of content items a user may scroll through in a content list may be predictable.

Typically, advertisement slots in a content list are predetermined before selecting the advertisement to diversify the mixture of organic and promoted content. In some implementations, subsequent impressions of advertisements from the same campaign may not be as invasive as showing a new advertisement and therefore more video ad slots may be added into the content list. If the user watches several seconds of a first advertisement in a campaign, the next advertisement in the campaign may be inserted 1, 2, or 3 list items down from the current position instead of further down at position number 4. Because in-feed advertisements are typically not related to the content they are mixed with, the other advertising slots may be shifted appropriately.

In some implementations, the first device may decrease content list latency by providing multiple related content items for display in the feed list under different conditions (e.g., a user watched greater than or less than a threshold amount of the first content item). The second device may use the conditions to determine which ad impression to show. Therefore, the user may be able to scroll through or advance the content list with reduced lag.

The cumulative playback time information and an identification of the content item(s) may be sent to the first device for further analysis. At a step 320', where the content item is an advertisement or other paid content, the first device compares the cumulative playback time that a series of content items in an ad campaign were played to a monetization threshold (e.g., 15 seconds, 30 seconds, 1 minute, etc.). If the duration is less than the monetization threshold, the content creator or publisher may not be charged for the display of the advertisement. If the duration is greater than the monetization threshold, the content creator or publisher may be charged for display of the advertisement. In some implementations, the content creator or publisher ad campaign may be charged when a certain number of videos from an advertising campaign have each had a duration greater than an individual threshold (e.g., 2 seconds, 3 seconds, etc.).

At step 322, the second device determines that the content list has advanced a second identified position within the display region of the content list where an item of content can be inserted. At step 324, the second device compares the cumulative playback time that the related items of content played with a predetermined threshold value. In some implementations the threshold value may be two seconds, but in other implementations the threshold value may be one second, three seconds, ten seconds, twenty seconds, or some other value.

If the cumulative playback time is less than or equal to the threshold, the second device may determine that the user scrolled past the inserted content item without watching it. If the cumulative playback time is less than the threshold, the next related content item may be rendered or displayed, at a step 326, at the next position. The second device the continues to track the content item at step 318'. If the cumulative playback time is greater than the threshold, the second device may determine that the user either started watching the content item and decided he was not interested in the content or watched the content item until completion indicating that he was interested in the content. If the cumulative playback time is greater than the threshold, the second device the second device may return to step 310 and request a new item of content. The second device may also remove other occurrences of the related content items from the content list.

Similar to method 300, in some implementations where the content item is an advertisement, the second device may play the next content item in an advertising campaign even if the cumulative playback time is greater than the threshold if the cumulative playback time is not greater than a monetization threshold.

Accordingly, the systems and methods discussed herein provide dynamic monitoring of interaction of a user with a list of content items, including automatically playing media, and insertion of paid content items at positions selected responsive to the interactions of the user, such that the user may be more likely to view the paid content. These systems further provide for association of inserted paid content with original content creators, allowing for incentivization of creation of popular content through revenue sharing or similar models.

In many implementations, data collected about a user may be anonymized or disambiguated to protect privacy. In many implementations in which personal information about the user of client device may be collected for measurement or used to select third-party content, the user may be provided with an opportunity to control whether programs or features that may collect personal information (e.g., information about a user's social network, social actions or activities, a user's preferences, or a user's current location) do so, or an opportunity to control whether or how to transmit measurement data to an audience measurement server and/or panel provider. In addition, certain data may be treated in one or more ways before it is stored or used by an audience measurement server, so that personally identifiable information is removed when generating parameters (e.g., demographic parameters). A user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by the audience measurement servers, panel providers, and content providers.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus on data stored on one or more computer-readable storage devices or received from other sources.

The term "client or "server" include all kinds of apparatus, devices, and machines for processing data, including a programmable processor, a computer, a system on a chip, or multiple ones or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; e.g., by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Communication networks can include various combinations of a local area network ("LAN"), a wide area network ("WAN"), an inter-network (e.g., the Internet), and peer-to-peer networks (e.g., ad hoc peer-to-peer networks).

The features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). Client devices receiving content and providing relay pings, identifiers, or other data to an audience measurement service and/or panel provider may be smart television modules. The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A method for providing video content in a content list, comprising:
   receiving, at a server from a device, a request for a content list;
   identifying, by the server, a plurality of positions within the content list where video content can be provided;
   providing, by the server to the device, the content list for presentation to a user and a client agent for execution by the device, the client agent configured to play items of content and determine that a first position of the plurality of positions is within a displayed region of the content list;
   receiving, by the server, a request from the device for a first item of content transmitted in response to the determination that the first position of the plurality of positions is within the displayed region of the content list;
   providing, by the server, the first item of content to the device for automatic playback at the first position within the content list, the client agent identifying a first duration during which the first item of content is within the displayed region of the content list, the client agent pausing playback of the first item of content at a point in time in response to the displayed region of the content list being advanced to no longer include the first position and comparing the first duration to a predetermined threshold value, the client agent determining that the displayed region of the content list has advanced to a second position of the plurality of positions and, responsive to a determination that the first duration is less than the predetermined threshold value, resuming playback of the first item of content near the point in time and at the second position of the content list.

2. The method of claim 1, further comprising providing, by the server to the device, a second item of content related to the first item of content for playback at a third position in the content list, responsive to a determination by the client agent that the first duration is less than the predetermined threshold.

3. The method of claim 2, further comprising:
receiving, by the server from the device, an identification of cumulative playback time comprising a sum of the first duration and a second duration of playback of the second item of content; and
comparing, by the server, the cumulative playback time to a monetization threshold.

4. The method of claim 1, further comprising providing, by the server to the device, a second item of content unrelated to the first item of content for playback at the second position in the content list, responsive to a determination by the client agent that the first duration is greater than the predetermined threshold.

5. The method of claim 1, further comprising comparing, by the server, the first duration to a monetization threshold different from the predetermined threshold.

6. The method of claim 1, further comprising providing, by the server to the device, a second item of content for playback at a third position in the content list, the first and second item of content provided together.

7. A system for displaying video content in a content list, comprising:
a device comprising a display and a processor executing a client agent, the display configured to display a content list, the device configured to receive the content list from a server, the content list comprising a plurality of positions where items of content can be provided;
wherein the client agent is configured to:
render the content list for display;
determine that the content list has advanced such that a first position of the plurality of positions is within a displayed region of the content list;
receive a first item of content transmitted from the server in response to the determination that the first position of the plurality of positions is within a displayed region of the content list;
render the first item of content for automatic playback at the first position within the content list;
identify a first duration that the first item of content is within the displayed region of the content list;
pause playback of the first item of content at a point in time in response to the displayed region of the content list being advanced to no longer include the first position;
determine that the content list has advanced such that a second position of the plurality of positions is within the display region of the content list;
compare the first duration to a predetermined threshold value; and
render, at the second position in response to the first duration being less than the predetermined threshold value, the first item of content for automatic playback beginning near the point in time.

8. The system of claim 7, wherein the client agent is configured to receive, from the server responsive to a determination that the first duration is less than the predetermined threshold, a second item of content related to the first item of content for playback at a third position in the content list.

9. The system of claim 8, wherein the client agent is configured to:
identify a cumulative playback time comprising a sum of the first duration and a second duration of playback of the second item of content; and
transmit the cumulative playback time to the server, the server comparing the cumulative playback time to a monetization threshold.

10. The system of claim 8, wherein client agent is configured to compare the first duration to a second predetermined threshold, the second position nearer to the first position responsive to the first duration being greater than a second predetermined threshold and farther from the first position responsive to the first duration being less than the second predetermined threshold.

11. The system of claim 7, wherein the device receives, from the server and responsive to a determination by the client agent that the first duration is greater than the predetermined threshold, a second item of content unrelated to the first item of content for playback at the second position in the content list.

12. The system of claim 7, wherein the device transmits the first duration to the server, the server comparing the first duration to a monetization threshold that is different from the predetermined threshold.

13. The system of claim 7, wherein the device receives, from the server, a second item of content for playback at a third position in the content list, the first and second item of content received together.

14. A method for displaying video content on a device in a content list, comprising:
receiving, by a device from a server, a content list comprising a plurality of positions where items of content can be provided;
rendering the content list for display;
determining, by a client agent executed by the device, that the content list has advanced such that a first position of the plurality of positions is within a displayed region of the content list;
receiving a first item of content transmitted from the server in response to the determination that the first position of the plurality of positions is within a displayed region of the content list;
rendering the first item of content for automatic playback at the first position within the content list;
identifying a first duration that the first item of content is within the displayed region of the content list;
pausing playback of the first item of content at a point in time in response to the displayed region of the content list being advanced to no longer include the first position;
determining that the content list has advanced such that a second position of the plurality of positions is within the display region of the content list;
comparing the first duration to a predetermined threshold value;
rendering, at the second position in response to the first duration being less than the predetermined threshold value, the first item of content for automatic playback beginning near the point in time.

15. The method of claim 14, further comprising receiving, by the client agent from the server, a second item of content related to the first item of content for playback at a third position in the content list responsive to a determination that the first duration is less than the predetermined threshold.

16. The method of claim 15, further comprising:
identifying, by the client agent, a cumulative playback time comprising a sum of the first duration and a second duration of playback of the second item of content; and
transmitting, from the device to the server, the cumulative playback time, the server comparing the cumulative playback time to a monetization threshold.

17. The method of claim 15, further comprising comparing, by the client agent, the first duration to the second predetermined threshold, the second position nearer to the first position responsive to the first duration being greater than a second predetermined threshold and farther from the first position responsive to the first duration being less than the second predetermined threshold.

18. The method of claim 14, further comprising receiving, from the server and responsive to a determination by the client agent that the first duration is greater than the predetermined threshold, a second item of content unrelated to the first item of content for playback at the second position in the content list.

19. The method of claim 14, further comprising transmitting the first duration to the server, the server comparing the first duration to a monetization threshold that is different from the predetermined threshold.

20. The method of claim 14, further comprising receiving, by the device from the server, a second item of content for playback at a third position in the content list, the first and second item of content received together.

\* \* \* \* \*